US012723703B2

(12) United States Patent
Ye et al.

(10) Patent No.: US 12,723,703 B2
(45) Date of Patent: Sep. 1, 2026

(54) SUPPORT BASE

(71) Applicant: GEMTEK TECHNOLOGY CO., LTD., Hsinchu County (TW)

(72) Inventors: Long-Sing Ye, Hsinchu County (TW); Hung-Kai Wang, Hsinchu County (TW)

(73) Assignee: GEMTEK TECHNOLOGY CO., LTD., Hsinchu County (TW)

( * ) Notice: Subject to any disclaimer, the term of this patent is extended or adjusted under 35 U.S.C. 154(b) by 71 days.

(21) Appl. No.: 18/909,961

(22) Filed: Oct. 9, 2024

(65) Prior Publication Data

US 2025/0264186 A1 Aug. 21, 2025

(30) Foreign Application Priority Data

Feb. 21, 2024 (TW) ................................ 113201811

(51) Int. Cl.
*F16M 11/22* (2006.01)

(52) U.S. Cl.
CPC .................................. *F16M 11/22* (2013.01)

(58) Field of Classification Search
CPC .. F16M 11/22; F16M 2200/08; G06F 1/1658; F06F 1/1607; A47B 21/0314; A47B 2021/0307; H05K 5/0234; H05K 5/0204
USPC ........................................ 248/127, 918, 459
See application file for complete search history.

(56) References Cited

U.S. PATENT DOCUMENTS

| | | | | | |
|---|---|---|---|---|---|
| 5,358,208 | A * | 10/1994 | Moseley, III | G06F 3/0395 | 248/441.1 |
| 5,397,081 | A * | 3/1995 | Landry | A47B 91/00 | 403/329 |
| 9,042,092 | B2 * | 5/2015 | Lu | F16M 11/041 | 361/679.29 |
| 2004/0061036 | A1 * | 4/2004 | Shida | G06F 1/16 | 248/346.07 |
| 2007/0076358 | A1 * | 4/2007 | Hsu | G06F 1/16 | 361/679.33 |
| 2007/0170337 | A1 * | 7/2007 | Chang | G06F 1/1607 | 248/346.01 |
| 2009/0166500 | A1 * | 7/2009 | Hsu | F16M 11/10 | 248/371 |
| 2012/0145835 | A1 * | 6/2012 | Zaharakis | F16M 13/00 | 248/65 |
| 2023/0200529 | A1 * | 6/2023 | Vlaar | A47B 21/0314 | 248/371 |
| 2025/0133671 | A1 * | 4/2025 | Kim | G02B 7/182 | |

* cited by examiner

*Primary Examiner* — Christopher Garft

(57) ABSTRACT

A support base is provided, including a support frame and a support bottom plate. The support frame has a bottom plate part, a supporting part and a bearing part. One side of the supporting part extends upwardly from one side of the bottom plate part, and one side of the bearing part extends from the other end of the supporting part in a direction away from the bottom plate part. The lateral side of the support bottom plate is assembled with one side of the bottom plate part, the support bottom plate and the bottom plate part form a common bottom surface, the other lateral side of the support bottom plate extends in the direction away from the bottom plate part, and the bearing part is vertically projected on the support bottom plate.

17 Claims, 6 Drawing Sheets

1
18
15
151
152
1524
15240
1523
16
1214
1521
15210
1522
1527
1213
1520
1523
15240
14
13
17
1222
122
1221
121
12
11
1214
17

SUPPORT BASE

CROSS REFERENCE TO RELATED APPLICATION

This application claims the priority benefit of Taiwan Patent Application No. 113201811, filed on Feb. 21, 2024, the full disclosure of which is incorporated herein by reference.

BACKGROUND

Technical Field

This application is related to a technical field of a machine, and is especially related to a support base.

Related Art

In the existing techniques, common holder used to place network sharers are usually configured according to the environment where the user needs to place the network sharer. Usually the foothold will provide the network sharer with a way to place the sharer vertically or horizontally, or it can also provide a foothold that allows two placement modes. However, the abovementioned holder for placing network sharers are generally designed with an open shape that occupies an unnecessarily large volume. Furthermore, for the stability of support and aesthetic nature of the shape, most holder are designed as a single piece. The result is that the foothold occupies a large volume when packaged and transported; consequently, the overall cost of the transportation fee is increased.

SUMMARY

The embodiments of the present application provide a support base which can resolve the issue of the excessively large package volume and reduce the required space for transportation.

To resolve the abovementioned technical problems, the present application is embodied as follows.

A support base is provided, including a support frame and a support bottom plate. The support frame has a bottom plate part, a supporting part and a bearing part. One side of the supporting part extends upwardly from one side of the bottom plate part, and one side of the bearing part extends from the other end of the supporting part in a direction away from the bottom plate part. The lateral side of the support bottom plate is assembled with one side of the bottom plate part, the support bottom plate and the bottom plate part form a common bottom surface, the other lateral side of the support bottom plate extends in a direction away from the bottom plate part, and the bearing part is vertically projected on the support bottom plate.

In one embodiment, the bottom plate part has a first main body and a first assembling structure, the first assembling structure is disposed on the bottom of the first main body, the support bottom plate has a second main body and a second assembling structure, the second assembling structure is disposed on one side of the second main body, and the second assembling structure and the first assembling structure are assembled with each other.

In one embodiment, the first assembling structure includes a plurality of fixing brackets disposed on the bottom of the first main body, the second assembling structure includes a plurality of plug connectors, and the plurality of plug connectors extend outwardly from one lateral side of the second main body, one end of each of the plurality of plug connectors is insertable into each of the plurality of fixing brackets.

In one embodiment, one end of each of the plurality of plug connectors has a fixing hole, the first assembling structure further includes a plurality of protrusion parts disposed on the bottom of the first main body, the plurality of protrusion parts are corresponding to one lateral side of the plurality of the fixing brackets, and the plurality of protrusion parts are fixed in the fixing holes of the plurality of plug connectors.

In one embodiment, each of the plurality of protrusion parts has an incline, the incline faces one end of the plug connector, and the incline is located on a moving path of one end of the plug connector.

In one embodiment, the second assembling structure includes a plurality of first lock fixing parts, the plurality of plug connectors have a plurality of lock fixing holes, the first main body has a plurality of inner lock fixing holes, and the plurality of first lock fixing parts are insertable into the plurality of lock fixing holes of the plurality of plug connectors and the plurality of inner lock fixing holes of the first main body.

In one embodiment, the second assembling structure includes a plurality of supporting pieces disposed outside the plurality of plug connectors, and one end of each of the plurality of supporting pieces extends and abuts against the bottom of the first main body of the bottom plate part.

In one embodiment, the second assembling structure includes two fixing parts disposed outside the second main body of the support bottom plate, one end of each of the fixing parts extends outwardly from the second main body, an outer side of one end of each of the fixing parts has a first lateral side, each of two outer lateral sides of the first main body of the bottom plate part has a second lateral side, each second lateral side corresponds to each first lateral side of the fixing part, and a contour of each first lateral side of the fixing part and a contour of each second lateral side of the bottom plate part are mutually engaged and fixed.

In one embodiment, the second assembling structure includes two fixing parts disposed outside the second main body of the support bottom plate, one end of each of the fixing parts extends outwardly from the second main body, the bottom side of one end of each fixing part has a first bottom side, each of two outer lateral sides of the first main body of the bottom plate part has a second bottom side, each second bottom side corresponds to each first bottom side of the fixing part, and the contour of each first bottom side of the fixing part and the contour of each second bottom side of the bottom plate part are mutually engaged and fixed.

In one embodiment, the second assembling structure comprises two fixing parts disposed outside the second main body of the support bottom plate, the first assembling structure further includes a frame disposed on the outer side of the bottom of the first main body, the two fixing parts are attached to the bottom of the first main body, and the thickness of the two fixing parts is equal to the height of the outer frame relative to the bottom of the first main body.

In one embodiment, the second assembling structure comprises two fixing parts disposed outside the second main body of the support bottom plate, the second assembling structure includes two second lock fixing parts, the two fixing parts have two lock fixing holes, the first main body has two outer lock fixing holes, the two second lock fixing parts are insertable into the two lock fixing holes of the two fixing parts and the two outer lock fixing holes of the first main body.

In one embodiment, the second assembling structure includes a plurality of supporting plates perpendicular to the top of one side of the second main body, and each of the plurality of supporting plates has a supporting side abutting against the supporting part.

In one embodiment, the contour of the supporting side and the surface of the supporting part are attached to each other.

In one embodiment, the bearing part includes a first bearing part and a second bearing part, one side of the first bearing part extends outwardly and horizontally from the other side of the supporting part, and one side of the second bearing part extends upwardly from the other side of the first bearing part.

In one embodiment, the first bearing part of the bearing part has a through hole and a fixed protrusion, and the fixed protrusion is located on one side of the through hole and is far away from the supporting part.

In one embodiment, the bearing part is used to bear a host, the fixed protrusion is used to restrict the location of the host, and the through hole is used for passing a plurality of connection wires connected to the host.

In one embodiment, a hook component having two hooks is further included, wherein the second bearing part of the bearing part has two hook holes and the two hooks are assembled into the two hook holes.

In one embodiment, the hook component further includes a board, the two hooks are configured on the board, the second bearing part further includes an accommodation groove, the two hook holes are configured in the accommodation groove, the two hook holes are connected to the accommodation groove, the board is assembled in the accommodation groove, and the two hooks are correspondingly assembled into the two hook holes.

In one embodiment, the second bearing part further includes a plurality of pillars configured in the accommodation groove, the board has a plurality of perforations, and the plurality of pillars are insertable through the plurality of perforations.

In one embodiment, the support frame includes two first seat legs disposed on the first main body which is far away from two corners on the two lateral sides of the support bottom plate, the support bottom plate includes two second seat legs disposed on the second main body which is far away from the two lateral sides of the bottom plate part, and the height of each first seat leg and that of each second seat leg is the same.

In the embodiments of the present application, the support base can be separated from the support frame and the support bottom plate for convenience in packaging and storage. In addition, after the support frame and the support bottom plate are combined, the length of the support bottom plate extends beyond the range of vertical projection of the bearing part such that the support bottom plate can provide a stable base for the support frame. The benefit of the support base of the present application is that it can be not only disassembled for storage but also assembled for use.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The accompanying drawings herein are provided to engender further understanding of the present application and constitute a part of the present application. The schematic embodiments and the descriptions of the present application are used to explain the present application rather than to constituting inappropriate limitations. In the drawings.

DETAILED DESCRIPTION OF THE EMBODIMENTS

Figure 1:
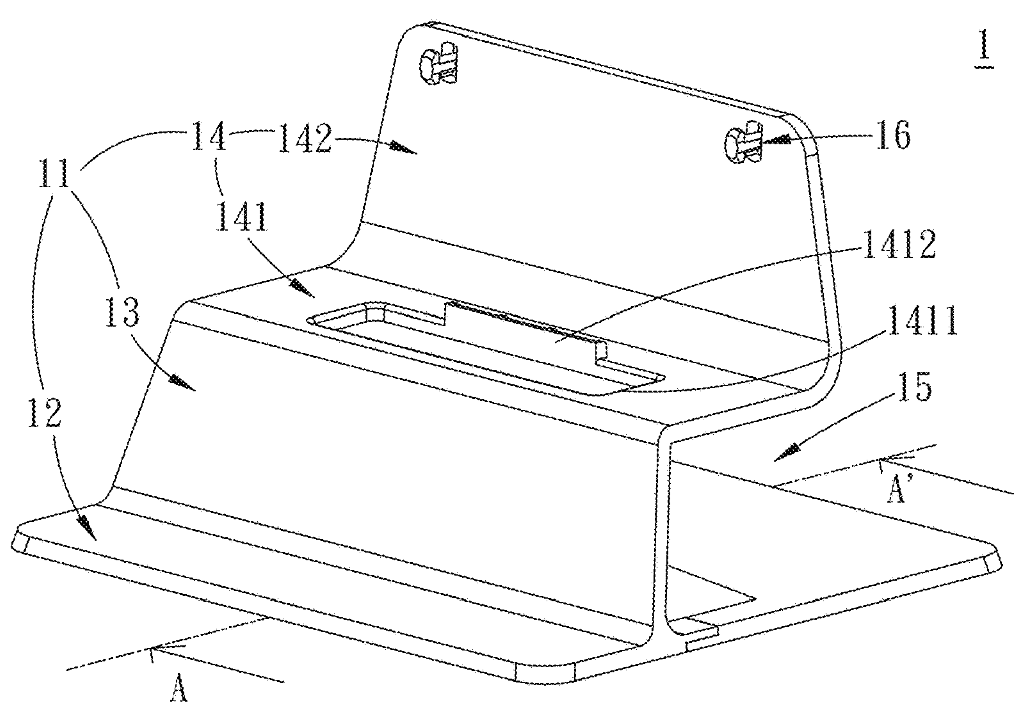
FIG. 1 is a perspective view of the support base of the present application.

Multiple embodiments of the present application are disclosed by the drawings as follows, and for precise explanation, the implementation details of the present application will be described together with multiple embodiments of the present application in the following paragraphs. However, it should be understood that the implementation details of the present application should not be construed as restrictions of the present application. In other words, in some of the embodiments of the present application, the implementation details of the present application are not essential. Moreover, for simplifying the drawings, some well-known structures and modules are schematically shown. In the following embodiments, the same reference numerals in different drawings represent the same or similar modules.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include/including” and “comprise/comprising” are used in an open-ended fashion, and thus should be interpreted as “including but not limited to”. “Substantial/substantially” means, within an acceptable error range wherein a person skilled in the art may solve the technical problem in such a range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms “include”, “contain”, and any variation thereof are intended to cover a non-exclusive inclusion. Therefore, a process, method, object, or device that comprises a series of elements includes not only these elements but also other elements not specified expressly, or may include inherent elements of the process, method, object, or device. If no more limitations are made, an element limited by "include a/an . . . " does not exclude other same elements existing in the process, the method, the article, or the device which comprises the element.

In the following embodiments, the same reference numerals are used to refer to the same or similar elements throughout the invention.

Figure 2:
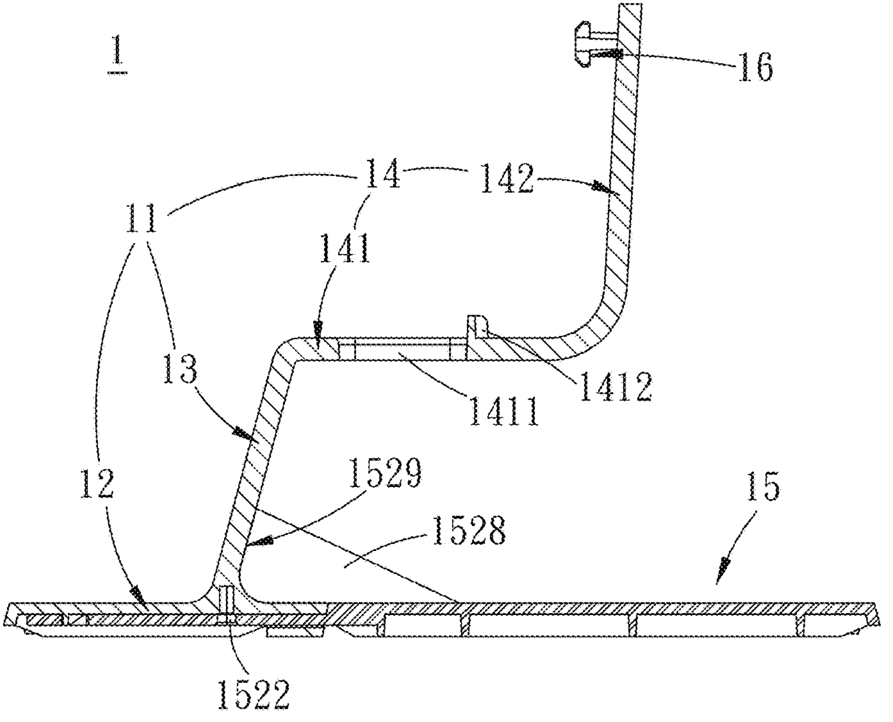
FIG. 2 is a cross-sectional view taken along line A-A' in FIG. 1.
Figure 3:
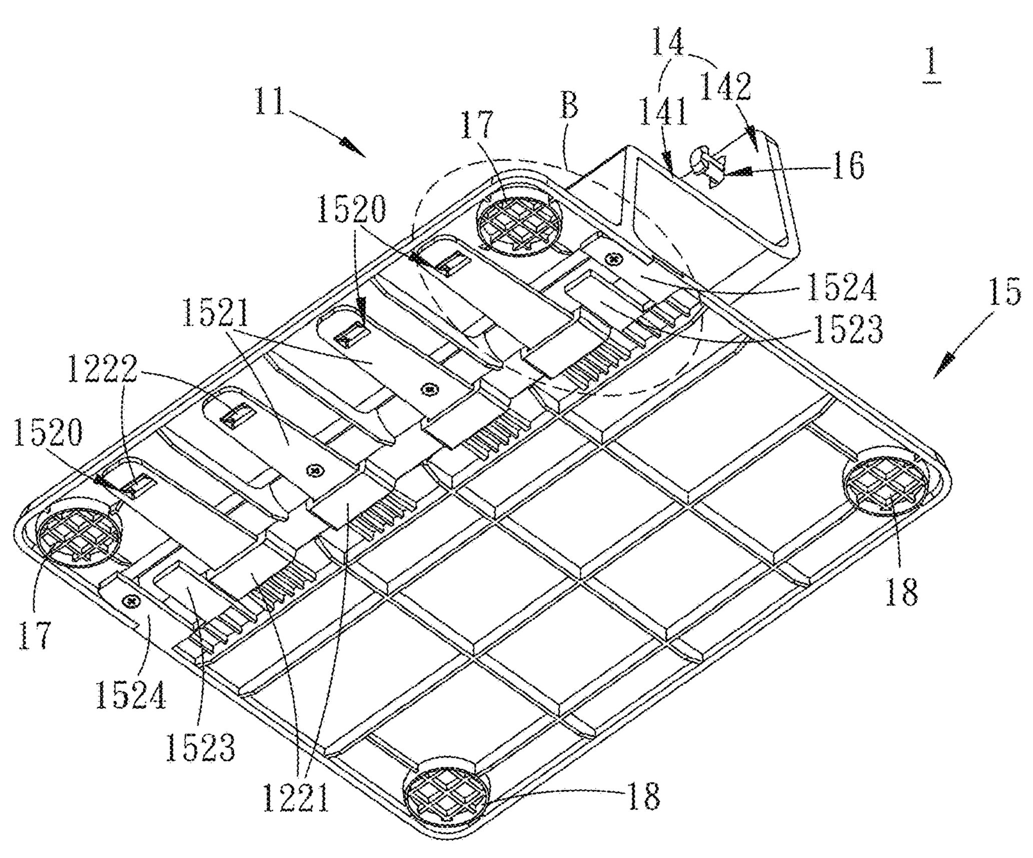
FIG. 3 is another perspective view of the support base of the present application.
Figure 4:
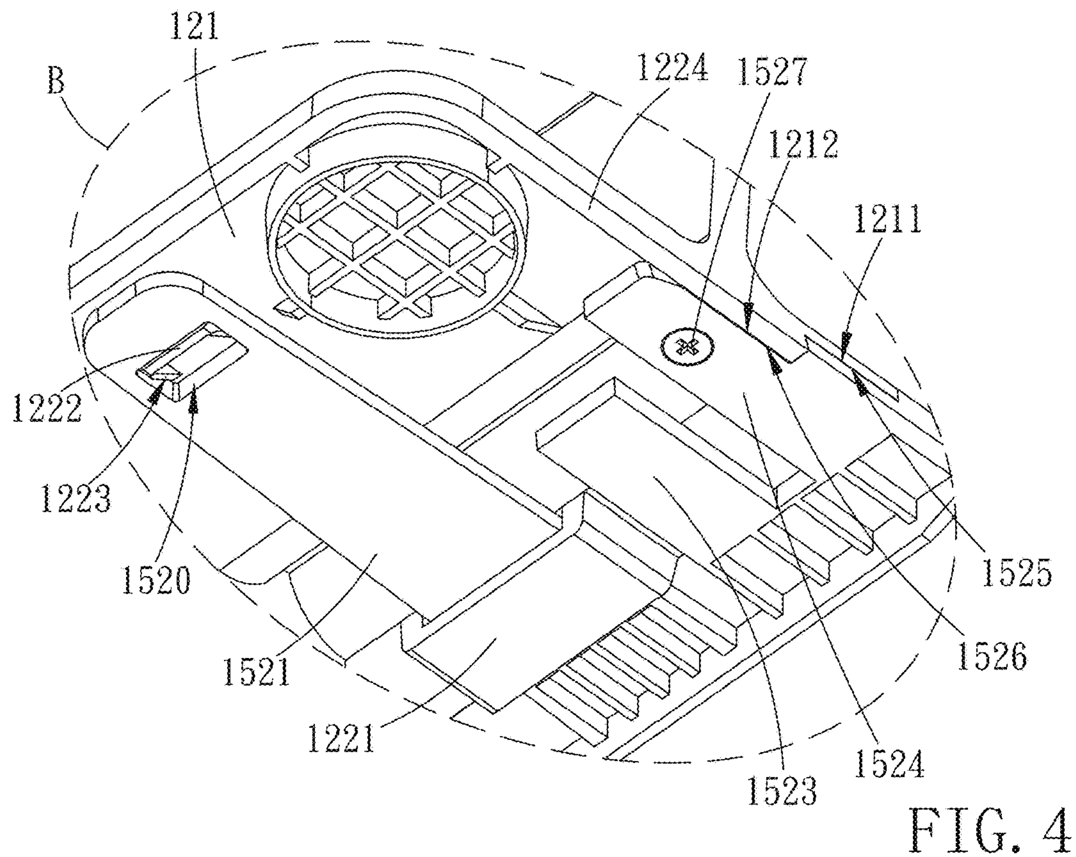
FIG. 4 is an enlarged view of area B in FIG. 3.
Figure 5:
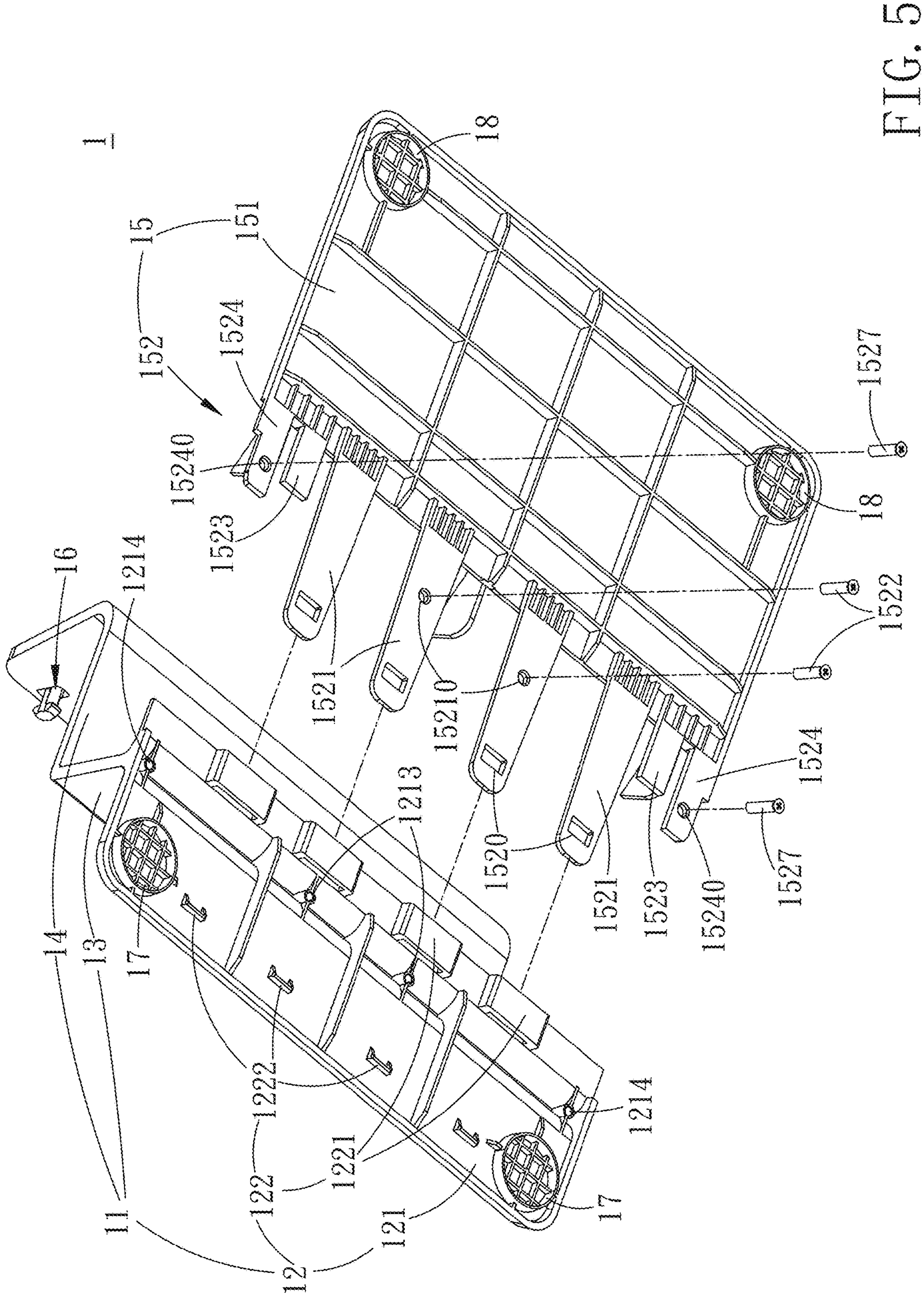
FIG. 5 is an exploded perspective view of the support base of the present application.

Please refer to FIG. 1 to FIG. 5. FIG. 1 is a perspective view of the support base of the present application, FIG. 2 is a cross-sectional view taken along line A-A' in FIG. 1, FIG. 3 is another perspective view of the support base, FIG. 4 is an enlarged view of area B in FIG. 3, and FIG. 5 is an exploded perspective view of the support base. As shown in the figures, this embodiment provides a support base 1 that can be used to place network sharers and other machines that require multiple wire connections. The support base 1 includes a support frame 11 and a support bottom plate 15. The support frame 11 has a bottom plate part 12, a supporting part 13 and a bearing part 14. One side of the supporting part 13 extends upwardly from one side of the bottom plate part 12, and one side of the bearing part 14 extends from the other end of the supporting part 13 in a direction away from the bottom plate part 12. A lateral side of the support bottom plate 15 is assembled with one side of the bottom plate part 12, the support bottom plate 15 and the bottom plate part 12 form a common bottom surface, the other lateral side of the support bottom plate 15 extends in the direction away from the bottom plate part 12, and the bearing part 14 is vertically projected on the support bottom plate 15. The support base 1 can be separated from the support frame 11 and the support bottom plate 15 for convenience in packaging and storage. After combination of the support frame 11 and the support bottom plate 15, the length of the support bottom plate 15 extends beyond the range of vertical projection of the bearing part 14 such that the support bottom plate 15 can provide a stable base for the support frame 11.

Please refer to FIG. 5 again. In this embodiment, the bottom plate part 12 has a first main body 121 and a first assembling structure 122, the first assembling structure 122 is disposed on a bottom of the first main body 121, the support bottom plate 15 has a second main body 151 and a second assembling structure 152, the second assembling structure 152 is disposed on one side of the second main body 151, and the second assembling structure 152 and the first assembling structure 122 are assembled with each other. In addition, the first assembling structure 122 includes a plurality of fixing brackets 1221 disposed on the bottom of the first main body 121, the second assembling structure 152 includes a plurality of plug connectors 1521, and the plurality of plug connectors 1521 extend outwardly from one lateral side of the second main body 151. One end of each of the plurality of plug connectors 1521 is insertable into each of the plurality of fixing brackets 1221. Hence the second assembling structure 152 of the second main body 151 is inserted into the first assembling structure 122 of the first main body 121 such that the first main body 121 and the second main body 151 are combined to assemble the complete base of the support base 1.

Please refer to FIG. 4 again. One end of each of the plurality of plug connectors 1521 has a fixing hole 1520, the first assembling structure 122 further includes a plurality of protrusion parts 1222 disposed on the bottom of the first main body 121, the plurality of protrusion parts 1222 are corresponding to one lateral side of the plurality of the fixing brackets 1221, and the plurality of protrusion parts 1222 are fixed in the fixing holes 1520 of the plurality of plug connectors 1521. Each of the plurality of protrusion parts 1222 has an incline 1223, the incline 1223 faces one end of the plug connector 1521, and the incline 1223 is located on a moving path of one end of the plug connector 1521. In this embodiment, one end of the plurality of the plug connectors 1521 can easily move along the incline 1223 of the protrusion part 1222, one side of the plug connector 1521 is protruded by the protrusion part 1222, and the other side of the plug connector 1521 is restricted by the fixing bracket 1221 to make the plug connector 1521 bend. After the fixing hole 1520 of the plug connector 1521 moves to the location of the protrusion part 1222, the plug connector 1521 is not protruded by the protrusion part 1222 anymore, and the fixing holes 1520 of the plurality of plug connectors 1521 will be leveled and cover the protrusion parts 1222. Thus, the second assembling structure 152 of the support bottom plate 15 is assembled with the first assembling structure 122 of the support frame 11.

Please refer to FIG. 5 again. In this embodiment, the second assembling structure 152 includes a plurality of first lock fixing parts 1522, the plurality of plug connectors 1521 have a plurality of lock fixing holes 15210, the first main body 121 has a plurality of inner lock fixing holes 1213, and the plurality of first lock fixing parts 1522 are insertable into the plurality of lock fixing holes 15210 of the plurality of plug connectors 1521 and the plurality of inner lock fixing holes 1213 of the first main body 121. Therefore, the first lock fixing part 1522 can enhance the combination strength between the second assembling structure 152 of the support bottom plate 15 and the first assembling structure 122 of the support frame 11.

Please refer to FIG. 4 and FIG. 5 again. In this embodiment, the second assembling structure 152 includes a plurality of supporting pieces 1523 disposed outside the plurality of plug connectors 1521, and one end of each of the plurality of supporting pieces 1523 extends and abuts against the bottom of the first main body 121 of the bottom plate part 12. When the first main body 121 is connected to and fixed to the second main body 151, the plurality of supporting pieces 1523 can be used as auxiliary supports to support the horizontal strength of the structure between the first main body 121 and the second main body 151. In other words, the first main body 121 and the second main body 151 cannot easily be bent or deformed by external forces.

Please refer to FIG. 4 again. The second assembling structure 152 includes two fixing parts 1524 disposed outside the second main body 151 of the support bottom plate 15, one end of each of the fixing parts 1524 extends outwardly from the second main body 151, an outer side of one end of each of the fixing parts 1524 has a first lateral side 1525, each of two outer lateral sides of the first main body 121 of the bottom plate part 12 has a second lateral side 1211, each second lateral side 1211 corresponds to each first lateral side 1525 of the fixing part 1524, and a contour of each first lateral side 1525 of the fixing part 1524 and a contour of each second lateral side 1211 of the bottom plate part 12 are mutually engaged and fixed. Furthermore, a bottom side of one end of each fixing part 1524 has a first bottom side 1526, each of two outer lateral sides of the first main body 121 of the bottom plate part 12 has a second bottom side 1212, each second bottom side 1212 corresponds to each first bottom side 1526 of the fixing part 1524, and a contour of each first bottom side 1526 of the fixing part 1524 and a contour of each second bottom side 1212 of the bottom plate part 12 are mutually engaged and fixed. Thus, the combination strength between the fixing part 1524 of the second assembling structure 152 and the contour of the bottom plate part 12 is enhanced.

As described above, the second assembling structure 152 includes two second lock fixing parts 1527, the two fixing parts 1524 have two lock fixing holes 15240, the first main body 121 has two outer lock fixing holes 1214, and the two second lock fixing parts 1527 are insertable into the two lock fixing holes 15240 of the two fixing parts 1524 and the two outer lock fixing holes 1214 of the first main body 121 so as to further enhance the binding strength between the fixing part 1524 of the second assembling structure 152 and the bottom plate part 12. In addition, the first assembling structure 122 further includes a frame 1224 disposed on an outer side of the bottom of the first main body 121, the two fixing parts 1524 are attached to the bottom of the first main body 121, and a thickness of the two fixing parts 1524 is equal to a height of the frame 1224 in relation to the bottom of the first main body 121.

Figure 6:
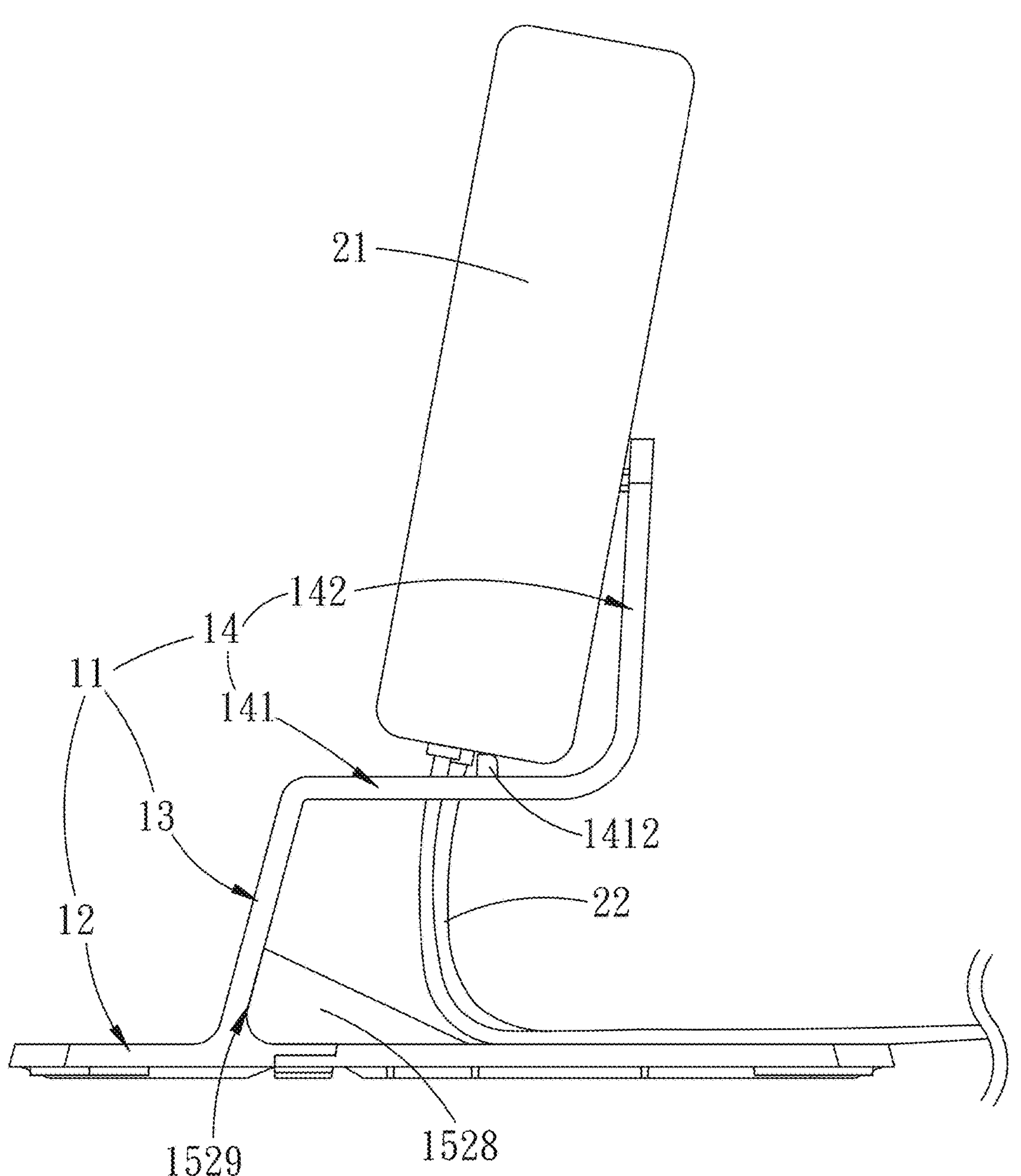
FIG. 6 is a schematic diagram of the use state of the support base of the present application.
Figure 7:
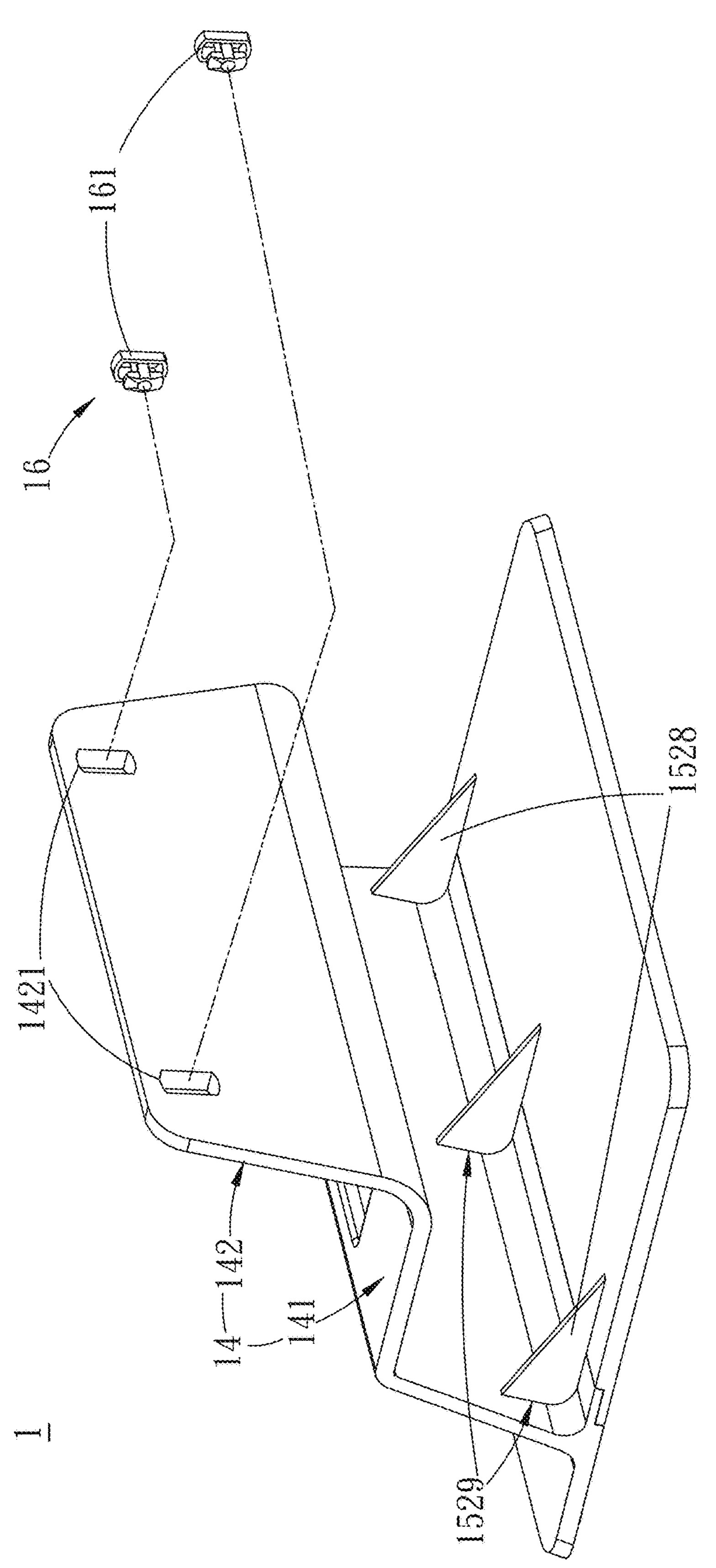
FIG. 7 is a schematic diagram of the first embodiment of the hook component of the support base of the present application.
Figure 8:
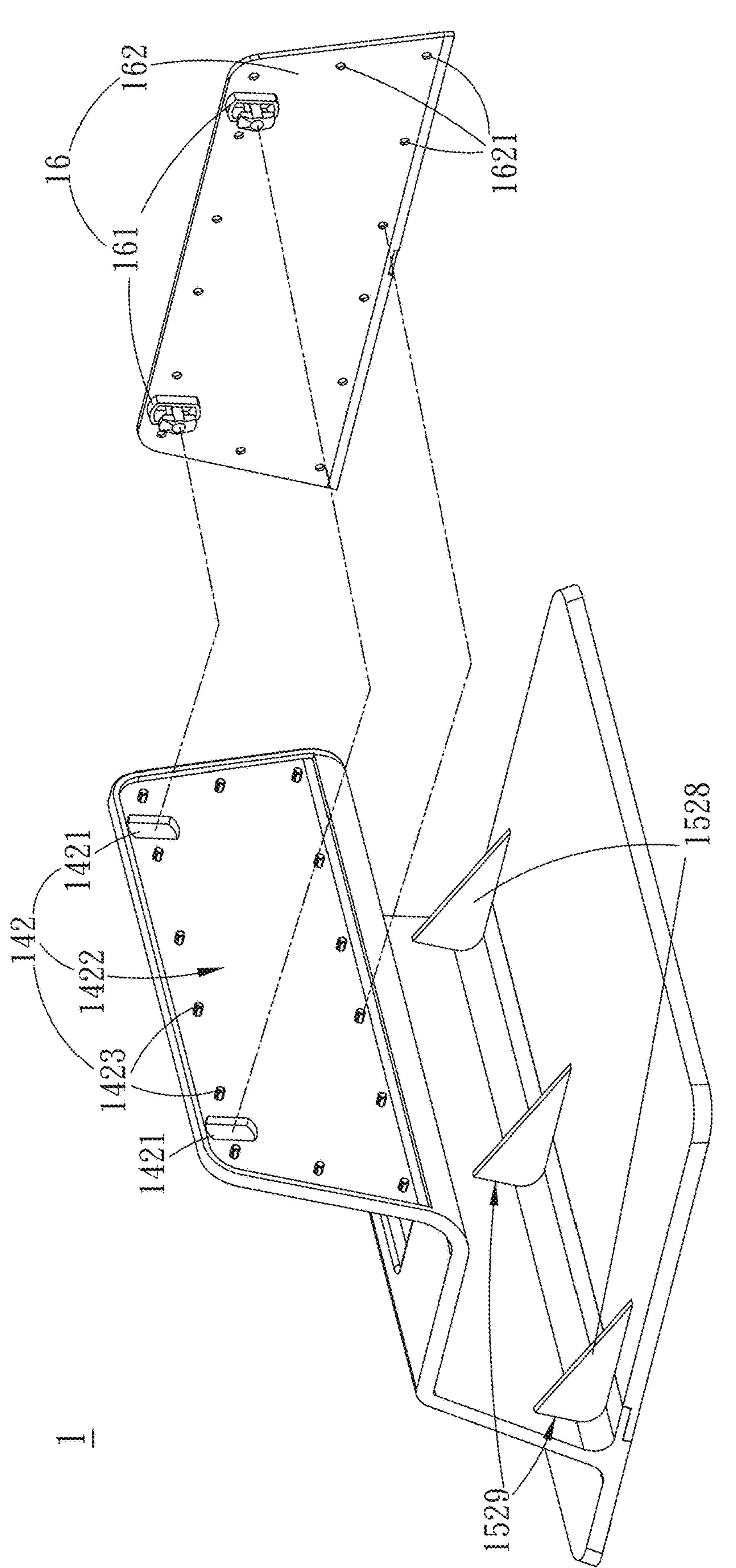
FIG. 8 is a schematic diagram of the second embodiment of the hook component of the support base of the present application.

Please refer to FIG. 6, which is a schematic diagram of the use state of the support base of the present application. As shown in the figure, in this embodiment, the second assembling structure 152 includes a plurality of supporting plates 1528 perpendicular to the top of one side of the second main body 151, and each of the plurality of supporting plates 1528 has a supporting side 1529 abutting against the supporting part 13 (as shown in FIG. 7 and FIG. 8). The contour of the supporting side 1529 and the surface of the supporting part 13 are attached to each other. The supporting side 1529 of the supporting plate 1528 can provide a supporting force to one side of the supporting part 13 so as to enhance the structural strength of the supporting part 13 of the support frame 11 to further increase a loading capacity of the bearing part 14 connected to the supporting part 13.

Please refer to FIG. 2 and FIG. 6 again. In this embodiment, the bearing part 14 of the support frame 11 is used to bear a host 21, the bearing part 14 includes a first bearing part 141 and a second bearing part 142, one side of the first bearing part 141 extends outwardly and horizontally from the other side of the supporting part 13, and one side of the second bearing part 142 extends upwardly from the other side of the first bearing part 141. Thus, the weight of the host 21 is borne by the first bearing part 141, and one side of the host 21 abuts against the second bearing part 142. Furthermore, the first bearing part 141 of the bearing part 14 has a through hole 1411 and a fixed protrusion 1412, and the fixed protrusion 1412 is located on one side of the through hole 1411 and is far away from the supporting part 13. When the bearing part 14 is used to bear a host 21, the fixed protrusion 1412 is used to restrict a location of the host 21 and the through hole 1411 is used for passing a plurality of connection wires 22 connected to the host 21, wherein the plurality of connection wires 22 are used to connect an external electronic device or used for providing power to the host 21, etc.

Please refer to FIG. 7, which is a schematic diagram of the first embodiment of the hook component of the support base of the present application. In this embodiment, the support base 1 further includes a hook component 16 having two hooks 161, the second bearing part 142 of the bearing part 14 has two hook holes 1421, and the two hooks 161 are assembled with the two hook holes 1421. The hook component 16 is used to fix the host 21 to abut against the lateral side of the second bearing part 142 to improve the fixation of the host 21 on the support base 1. The hook 161 in the present application is convenient for the users to maintain or replace.

Please refer to FIG. 8, which is a schematic diagram of the second embodiment of the hook component of the support base of the present application. As shown in the figure, the difference in this embodiment from the first embodiment of the hook component lies in the assembling manner of the hook structure. In this embodiment, the hook component 16 further includes a board 162, the two hooks 161 are configured on the board 162, the second bearing part 142 further includes an accommodation groove 1422, the two hook holes 1421 are configured in the accommodation groove 1422, the two hook holes 1421 are connected to the accommodation groove 1422, the board 162 is assembled in the accommodation groove 1422, and the two hooks 161 are correspondingly assembled into the two hook holes 1421. The second bearing part 142 further includes a plurality of pillars 1423 configured in the accommodation groove 1422, the board 162 has a plurality of perforations 1621, and the plurality of pillars 1423 are insertable into the plurality of perforations 1621. The efficiency of the hook component 16 in this embodiment is the same as that in the first embodiment, and thus no further details will be given.

Please refer to FIG. 3 again. The support frame 11 includes two first seat legs 17 disposed on the first main body 121 which are far away from two corners on the two lateral sides of the support bottom plate 15, the support bottom plate 15 includes two second seat legs 18 disposed on the second main body 151 which are far away from two lateral sides of the bottom plate part 12, and a height of each first seat leg 17 and that of each second seat leg 18 is the same. The two first seat legs 17 and the two second seat legs 18 are all circular frame structures so that the support base 1 can be stably placed on a plane.

In summary, the present application provides a support base which can be separated into the support frame and the support bottom plate for convenience in packaging and storage. In addition, after the combination of the support frame and the support bottom plate, the length of the support bottom plate extends beyond the range of vertical projection of the bearing part such that the support bottom plate can provide a stable base for the support frame. The benefit of the support base of the present application is that it can be not only disassembled for storage but also assembled for use.

It is to be understood that the term "comprises", "comprising", or any other variants thereof is intended to encompass a non-exclusive inclusion, such that a process, method, article, or device of a series of elements not only includes those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art of the present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A support base, comprising:

a support frame having a bottom plate part, a supporting part and a bearing part, wherein one side of the supporting part extends upwardly from one side of the bottom plate part and one side of the bearing part extends from the other end of the supporting part in a direction away from the bottom plate part; and a support bottom plate, wherein a lateral side of the support bottom plate is assembled with one side of the bottom plate part, the support bottom plate and the bottom plate part form a common bottom surface, the other lateral side of the support bottom plate extends in the direction away from the bottom plate part, and the bearing part is vertically projected on the support bottom plate, wherein the bottom plate part has a first main body and a first assembling structure, the first assembling structure is disposed on a bottom of the first main body, the support bottom plate has a second main body and a second assembling structure, the second assembling structure is disposed on one side of the second main body, and the second assembling structure and the first assembling structure are assembled with each other; wherein the first assembling structure comprises a plurality of fixing brackets disposed on the bottom of the first main body, the second assembling structure comprises a plurality of plug connectors, and the plurality of plug connectors extend outwardly from one lateral side of the second main body, one end of each of the plurality of plug connectors is insertable into each of the plurality of fixing brackets; and wherein one end of each of the plurality of plug connectors has a fixing hole, the first assembling structure further comprises a plurality of protrusion parts disposed on the bottom of the first main body, the plurality of protrusion parts are corresponding to one lateral side of the plurality of the fixing brackets, and the plurality of protrusion parts are fixed in the fixing holes of the plurality of plug connectors.

2. The support base as claimed in claim 1, wherein each of the plurality of protrusion parts has an incline, the incline faces one end of the plug connector, and the incline is located on a moving path of one end of the plug connector.

3. The support base as claimed in claim 1, wherein the second assembling structure comprises a plurality of first lock fixing parts, the plurality of plug connectors have a plurality of lock fixing holes, the first main body has a plurality of inner lock fixing holes, and the plurality of first lock fixing parts are insertable into the plurality of lock fixing holes of the plurality of plug connectors and the plurality of inner lock fixing holes of the first main body.

4. The support base as claimed in claim 1, wherein the second assembling structure comprises a plurality of supporting pieces disposed outside the plurality of plug connectors, and one end of each of the plurality of supporting pieces extends and abuts against the bottom of the first main body of the bottom plate part.

5. The support base as claimed in claim 1, wherein the second assembling structure comprises two fixing parts disposed outside the second main body of the support bottom plate, one end of each of the fixing parts extends outwardly from the second main body, an outer side of one end of each of the fixing parts has a first lateral side, each of the two outer lateral sides of the first main body of the bottom plate part has a second lateral side, each second lateral side corresponds to each first lateral side of the fixing part, and a contour of each first lateral side of the fixing part and a contour of each second lateral side of the bottom plate part are mutually engaged and fixed.

6. The support base as claimed in claim 1, wherein the second assembling structure comprises two fixing parts disposed outside the second main body of the support bottom plate, one end of each of the fixing parts extends outwardly from the second main body, a bottom side of one end of each fixing part has a first bottom side, each of two outer lateral sides of the first main body of the bottom plate part has a second bottom side, each second bottom side corresponds to each first bottom side of the fixing part, and a contour of each first bottom side of the fixing part and a contour of each second bottom side of the bottom plate part are mutually engaged and fixed.

7. The support base as claimed in claim 1, wherein the second assembling structure comprises two fixing parts disposed outside the second main body of the support bottom plate, the first assembling structure further comprises a frame disposed on an outer side of the bottom of the first main body, the two fixing parts are attached to the bottom of the first main body, and a thickness of the two fixing parts is equal to a height of the frame relative to the bottom of the first main body.

8. The support base as claimed in claim 1, wherein the second assembling structure comprises two fixing parts disposed outside the second main body of the support bottom plate, the second assembling structure comprises two second lock fixing parts, the two fixing parts have two lock fixing holes, the first main body has two outer lock fixing holes, and the two second lock fixing parts are insertable into the two lock fixing holes of the two fixing parts and the two outer lock fixing holes of the first main body.

9. The support base as claimed in claim 1, wherein the second assembling structure comprises a plurality of supporting plates perpendicular to a top of one side of the second main body, and each of the plurality of supporting plates has a supporting side abutting against the supporting part.

10. The support base as claimed in claim 9, wherein a contour of the supporting side and a surface of the supporting part are attached to each other.

11. The support base as claimed in claim 1, wherein the bearing part comprises a first bearing part and a second bearing part, one side of the first bearing part extends outwardly and horizontally from the other end of the supporting part, and one side of the second bearing part extends upwardly from the other side of the first bearing part.

12. The support base as claimed in claim 11, wherein the first bearing part of the bearing part has a through hole and a fixed protrusion, and the fixed protrusion is located on one side of the through hole and is far away from the supporting part.

13. The support base as claimed in claim 12, wherein the bearing part is used to bear a host, the fixed protrusion is used to restrict a location of the host, and the through hole is used for passing a plurality of connection wires connected to the host.

14. The support base as claimed in claim 11, further comprising a hook component having two hooks, wherein the second bearing part of the bearing part has two hook holes, and the two hooks are assembled into the two hook holes.

15. The support base as claimed in claim 14, wherein the hook component further comprises a board, the two hooks are configured on the board, the second bearing part further comprises an accommodation groove, the two hook holes are configured in the accommodation groove, the two hook holes are connected to the accommodation groove, the board is assembled in the accommodation groove, and the two hooks are correspondingly assembled into the two hook holes.

16. The support base as claimed in claim 15, wherein the second bearing part further comprises a plurality of pillars configured in the accommodation groove, the board has a plurality of perforations, and the plurality of pillars are insertable through the plurality of perforations.

17. The support base as claimed in claim 1, wherein the support frame comprises two first seat legs disposed on the first main body which is far away from two corners on the two lateral sides of the support bottom plate, the support bottom plate comprises two second seat legs disposed on the second main body which is far away from the two lateral sides of the bottom plate part, and a height of each first seat leg and that of each second seat leg is the same.

* * * * *